United States Patent [19]
Koslowski

[11] Patent Number: 5,015,450
[45] Date of Patent: May 14, 1991

[54] PROCESS FOR MAKING CALCIUM SULFATE ALPHA-HEMIHYDRATE FROM CALCIUM SULFATE DIHYDRATE

[75] Inventor: Thomas J. Koslowski, Aachen, Fed. Rep. of Germany

[73] Assignees: Promineral Gesellschaft zur Verwendung Von Mineralstoffen mbH, Essen; Sicowa Verfahrenstechnik fur Baustoffe GmbH & Co. KG, Aachen, both of Fed. Rep. of Germany

[21] Appl. No.: 197,442

[22] Filed: May 23, 1988

[30] Foreign Application Priority Data

May 22, 1987 [DE] Fed. Rep. of Germany ....... 3717187

[51] Int. Cl.$^5$ .................. C04B 11/02; C04B 11/024
[52] U.S. Cl. ....................................... 423/172; 156/43; 264/333; 423/170; 423/171
[58] Field of Search ................ 423/172, 171, 170; 264/333; 156/43; 106/774, 772

[56] References Cited

U.S. PATENT DOCUMENTS

| | | | |
|---|---|---|---|
| 1,901,051 | 3/1933 | Randel et al. | 423/172 |
| 3,410,655 | 11/1968 | Ruter et al. | 423/170 |
| 4,309,391 | 1/1982 | O'Neill | 423/555 |
| 4,540,555 | 9/1985 | Franke et al. | 423/555 |

FOREIGN PATENT DOCUMENTS

| | | | |
|---|---|---|---|
| 2049028 | 4/1971 | Fed. Rep. of Germany . | |
| 3117662 | 11/1982 | Fed. Rep. of Germany . | |
| 3502637 | 9/1986 | Fed. Rep. of Germany . | |
| 47-20460 | 10/1972 | Japan | 423/170 |
| 829652 | 3/1960 | United Kingdom | 423/172 |

OTHER PUBLICATIONS

Browning, *Chemical Engineering*, Dec. 4, 1967, pp. 147–170.
Ullmanns Encyklopadie der Technischen Chemie, Fungizide Bis Holzwerkstoffe, Verlag Chemie, Weinheim-New York, 1976, Band 12, pp. 301, 303, 304.
Baugipse, Begriff, Sorten und Verwendung, Lieferung und Kennzeichnung, DIN 1168 Teil 1, Jan. 1986, Preisgr. 4, pp. 1, 2, 3.
Baugipse, Andorderungen, Prufung, Uberwachung, DIN 1168 Teil 2, Jul. 1975 (Fachnormenausschuss Bauwesen (FNBau) im Deutschen Normenausschuss (DNA) . . . ).

*Primary Examiner*—Gary P. Straub
*Assistant Examiner*—Stephen G. Kalinchak
*Attorney, Agent, or Firm*—Herbert Dubno

[57] ABSTRACT

The process makes calcium sulfate alpha-hemihydrate from finely divided calcium sulfate dihydrate by transforming the calcium sulfate dihydrate in the presence of saturated steam. A molded body is formed from the calcium sulfate dihydrate which has a plurality of pores having a pore volume amounting to 15 to 60% by volume of the total volume of the entire molded body. More than 5% by volume of the pore volume contains air. The molded body is fed to the autoclave. In the presence of a sufficient water quantity in the pores the crystal habit and the crystal growth of the calcium sulfate alpha-hemihydrate crystals which grow in an aqueous solution phase are controlled by a process temperature in the range between 110° to 180° C. by the pressure of the process atmosphere in the autoclave. The molded body is removed from the autoclave after recrystallization transformation and delivered for use. Key products of this process and their derivatives are also described.

12 Claims, 6 Drawing Sheets

FIG.1

PROCESS FOR MAKING CALCIUM SULFATE ALPHA-HEMIHYDRATE FROM CALCIUM SULFATE DIHYDRATE

CROSS REFERENCE TO RELATED APPLICATION

This application is related to my copending application Ser. No. 07/197,604 filed May 23, 1988.

1. Field of the Invention

My present invention relates to a process for making calcium sulfate alpha-hemihydrate from finely divided gypsum or calcium sulfate dihydrate and, more particularly, to a process for making calcium sulfate alpha-hemihydrate by recrystallization transformation or recrystallization of calcium sulfate dihydrate in the presence of saturated steam.

The calcium sulfate dihydrate used in my invention can be from any source. It can be naturally occurring gypsum or synthetic gypsum. The calcium sulfate alpha-hemihydrate can be used for a variety of purposes, e.g. as a building material and as a filler.

2. Background of the Invention

A process is known for making a calcium sulfate alpha-hemihydrate suitable as a construction material from a moist finely divided gypsum obtained by desulfurization of flue gas from a power plant fired by brown coal, especially from a gypsum obtained by flue gas desulfurization by a wet flue gas desulfurization unit. This process proceeds by recrystallization transformation of the calcium sulfate dihydrate contained in the gypsum in the presence of saturated steam.

Different processes are known for transforming calcium sulfate dihydrate into calcium sulfate alpha-hemihydrate. My invention is based on a process for making calcium sulfate alpha-hemihydrate from natural gypsum described in Ullmanns Encyklokädie der technischen Chemie, Bd. 12, 1976, Seite 301 (Ullmans Encyclopedia of Industrial Chemistry, 12, 301 (1976)). In this process, calcium sulfate dihydrate pieces, namely naturally occurring gypsum pieces, are fed to an autoclave and are converted to calcium sulfate alpha-hemihydrate pieces in the autoclave in the presence of saturated steam at a temperature of 130° to 135° C.

This alpha-hemihydrate product is dried above the thermal stability limit temperature of calcium sulfate dihydrate and is ground up for further use.

Specifically the gypsum recovered from a natural deposit is broken up into a grain size of 150 to 300 mm, is filled into baskets and is fed to an oven in the baskets. It is directly or indirectly heated with steam from 130° to 135° C.

The heating is controlled so that a pressure of 4 to 5 bar builds up in about four hours according to a saturated steam curve.

Then the autoclave is emptied. The alpha-hemihydrate gypsum is introduced into a drying chamber in the baskets and dried under standard pressure at about 105° C. and subsequently finely ground.

In the surface regions of the pieces of material one finds well defined calcium sulfate alpha-hemihydrate crystals which grow in a more or less needle shape.

In the core of the pieces of material after autoclaving structures with diffuse crystal pattern and also residual calcium sulfate dihydrate are indeed found even after very long treatment times.

The crystal pattern and also the surface fine structure are not controllable with the steps of this known process. Crystal pattern means the grain size and structure of the surface of the crystal. The surface fine structure means the topography of the surfaces of the crystal. The quality of the calcium sulfate alpha-hemihydrate product needs improvement because of these reasons.

With so-called chemical gypsum, as produced in finely divided form for example in phosphoric acid manufacture, it is known to mix the chemical gypsum with water to form a suspension or slurry and to deliver it to a flotation unit for removal of organic impurities.

Subsequently the water soluble and the water insoluble impurities are separated by a counterflow wash in a scrubbing tower or in a hydrocyclone.

Then the gypsum/water slurry is pumped continuously into an autoclave and transformed at a temperature of about 150° C. and an appropriate saturated steam pressure into calcium sulfate alpha-hemihydrate.

Additives for control of the pH-value and for changing the crystal pattern can be metered into the autoclave and a product alpha-hemihydrate with a variety of properties can be attained.

In this known process however the expensive purification steps are troublesome and the large quantities of water required for crystallization lead to problems in drying and separation.

Here well defined calcium sulfate alpha-hemihydrate crystals arise more by chance and control of the process in regard to crystal pattern and surface fine structure of the crystals formed is not provided. Indeed, manufacture of calcium sulfate alpha-hemihydrate with a special and well defined crystal pattern and also a well defined surface fine structure leads to a product with special properties for a variety of applications in the construction industry.

OBJECTS OF THE INVENTION

It is an object of my invention to provide an improved process for making calcium sulfate alpha-hemihydrate from calcium sulfate dihydrate which does not have the above mentioned disadvantages and/or difficulties.

It is also an object of my invention to provide an improved process for making calcium sulfate alpha-hemihydrate from calcium sulfate dihydrate, which leads to a product which practically completely and homogeneously comprises calcium sulfate alpha-hemihydrate crystals.

It is another object of my invention to provide an improved process for making calcium sulfate alpha-hemihydrate from calcium sulfate dihydrate, which can be controlled to produce a product having a reproducible and predetermined crystal pattern and surface fine structure.

It is a further object of my invention to provide an improved calcium sulfate alpha-hemihydrate product having a predetermined crystal pattern and surface fine structure as well as a very homogeneous chemical composition.

SUMMARY OF THE INVENTION

These objects and others which will become more readily apparent hereinafter are attained in accordance with my invention in a process for making calcium sulfate alpha-hemihydrate suitable for a construction material from a finely divided calcium sulfate dihydrate by recrystallization transformation of the calcium sulfate dihydrate in the presence of saturated steam.

According to my invention a molded body is formed from calcium sulfate dihydrate whose pore volume is 15 to 60% of total volume and more than 5% by volume of the pore volume contains air (all percentages being related to the total volume of an individual molded body).

The molded body is fed to an autoclave. The crystal growth and the crystal pattern of the calcium sulfate alpha-hemihydrate which grows from an aqueous solution phase is regulated by a process temperature in the range between 110° C. and 180° C. and by the pressure of the process atmosphere in the autoclave and the molded body is removed from the autoclave and delivered for use after the recrystallization transformation.

Furthermore the molded body is usually first dried above the thermal stability limit of the calcium sulfate dihydrate and after that delivered for use. In that connection the body can be ground up for example and further processed, e.g. by sifting or classification.

The drying is generally continued until the product has less than 1% moisture by weight. The molded body so formed has an open pore system of effective capillaries (i.e. a high degree of capillarity).

Sufficient amounts of water can be provided in the pores in several different ways according to my invention. The invention uses the fact that molded bodies made from finely divided calcium sulfate dihydrate which have the given pore volume have a large capillary water capacity and consequently take up condensed water.

Advantageously in my invention the molded bodies are fed into the autoclave at the ambient or surrounding temperature or a slightly higher temperature and condensed water is formed by condensation of the saturated steam on the surface of the molded bodies which subsequently is drawn into the pores of the molded body by capillary action. Generally the amount of water in the pores is kept at least partially in the finely divided calcium sulfate dihydrate from which the molded bodies are formed, for example as residual moisture. The required or optimum amounts of physically bound water may be easily determined by experiment. It should amount to about one percent by weight generally at the beginning of the recrystallization transformation.

The process according to my invention produces a fully and very homogeneous calcium sulfate alpha-hemihydrate in the form of very uniform crystals with a controllable crystal pattern. If the process of my invention is not used, the molded body is destroyed by cracking and fracturing during the autoclaving process. That is surprising because in the currently described processes for making the alpha-hemihydrate gypsum from natural gypsum structures arise with diffuse crystal structures in the core of the individual pieces of the gypsum stone and the recrystallization transformation does not occur satisfactorily.

The effect of the invention is based on the fact that water and sufficient space because of available pore space is present for mass transport during the recrystallization transformation in the pore volume before the start of the recrystallization transformation which occurs from the solution phase.

To utilize the gypsum made by desulfurizing flue gas in commercial construction as is already described in German Patent 35 02 637, the gypsum made by desulfurizing flue gas can be formed in pieces and the pieces can be calcined with or without pressure by saturated or superheated steam without an autoclave. Special parameters for a recrystallization transformation to a well defined crystal structure are not part of the requirements. This known process cannot make calcium sulfate alpha-hemihydrate with a well defined crystal pattern and control the crystal pattern. That also is true for another known process (German Patent 31 17 662) which is based on gypsum made by desulfurizing flue gas and with which wall building blocks are formed, primarily with addition of sand.

In particular in the scope of the invention several other structures and forms are possible. Thus one works appropriately with molded blocks which have a pore volume of 20 to 50% of total volume. Particularly good results are obtained when molded bodies are formed which have a pore content of 25 to 35% of total volume. Advantageously the molded body which is formed has least half of its pore volume filled with air.

The molded body can be formed in different ways according to my invention. The way it is formed depends on the physical parameters of the finely divided calcium sulfate dihydrate. If the $CaSO_4 \cdot 2H_2O$ is dry or substantially dry, I can mix a suitable binder with the finely divided calcium sulfate dihydrate.

The pore volume can be adjusted or influenced by the addition of a foam as has been done in the manufacture of light building materials.

If the calcium sulfate dihydrate from the outset has sufficient physically bound water, e.g. in the form of residual moisture or water is mixed with dihydrate, my invention teaches that the calcium sulfate dihydrate is formed into a molded body by pressing. More specifically, the gypsum made by desulfurizing flue gas to a rigid molded body is autoclaved with a press pressure of up to 14 $N/mm^2$, the pressure being regulated according to the content of the physically bound water in the range from 3 to 20 weight percent of the gypsum.

The less the water content in the gypsum made by desulfurizing flue gas, the higher is the appropriate press pressure—and vice versa, understandably considering the pore volume.

Surprisingly the product molded body has on the one hand the pore volume essential for the invention with the appropriate water content and on the other hand is rigid in autoclaving. If one works with shaped stones, they can be stacked in the autoclave with open slots or joints which is advantageous for the controlled recrystallization transformation.

Additives which influence crystal growth according to the source of the calcium sulfate dihydrate often cannot be omitted as is usual with other processes for recrystallization transformation of calcium sulfate dihydrate to calcium sulfate alpha-hemihydrate.

That is particularly true when large crystals must be made. Such additives include for example acyclic carboxylic acids such as formic acid, oxalic acid, malonic acid, succinic acid, adipic acid, fumaric acid, malic acid, tartaric acid, citric acid and gluconic acid and their salts. Also sulfite waste liquor can be used. The process according to my invention allows crystal growth influencing additives to be used which heretofor have not been used for that purpose.

In this connection my invention teaches that finely ground brown coal and/or peat and/or finely ground wood and/or humic acid and/or equally effective wood containing material should be added to the calcium sulfate dihydrate to be transformed as crystal growth influencing additives. These particular additives are in great supply and are economical.

The invention's teachings have independent significance in regard to these additives. These additives are suitable for improvement of the products from other processes for transforming calcium sulfate dihydrate to calcium sulfate alpha-hemihydrate. The finely ground brown coal or peat and/or the equally effective wood containing materials are used advantageously with a piece or particle size of about 100 micrometers.

Thus the ground brown coal can be present in an amount equal to about 0.10 to 1.0% by weight. Furthermore 0.10 to 1.5% by weight, advantageously 0.50 to 1% by weight, ground peat can be used. Equally effective wood containing material also means ground wood, which can be added in an amount equal to from 0.30 to about 2.0% by weight, advantageously of 0.70 to 1.5% by weight. Humic acid can be included in in a quantity from 0.10 to 1.0% by weight, advantageously 0.30 to 7% by weight and comprises a wood containing substance.

Sulfite wash liquor is effective as a crystal growth influencing additive at a level of from 0.10 to 3.0% by weight, advantageously 0.50 to 2% by weight. Also effective are products obtained from sulfite wash liquor or secondary recrystallization transformation products of native lignins, such as for example lignin sulfonic acid; these products are usable in an amount equal to from 0.10 to 1.5% by weight, advantageously 0.30 to 1.2% by weight. Finally lignin sulfonate can be used as an additive in an amount from about 0.10 to 1.2% by weight, advantageously from 0.30 to 0.80% by weight. The crystal growth can also be influenced when a portion of the calcium sulfate dihydrate to be transformed is gypsum obtained from desulfurizing flue gas from a power plant fired with brown coal, for example in a quantity of at least 25% by weight.

To obtain needle-like calcium sulfate alpha-hemihydrate crystals with a faster reaction speed, my invention teaches operation primarily at process temperatures above 140° C.

To make, by contrast, compact prismatic calcium sulfate alpha-hemihydrate crystals one should operate with process temperatures primarily in a range from 120° C. to 140° C. Primarily means that also for short time intervals the recrystallization transformation can occur at different temperatures and that particularly processing before the start of the recrystallization transformation can take place at different temperatures.

If one operates at processing temperatures of 140° C. to 160° C. one obtains an increasing proportion of smaller and heavier crystals of needle-like calcium sulfate anhydrite crystals with increasing process temperatures. With temperatures above 160° C. one obtains a growing proportion of anhydrite fragments with longer dwell time.

One can continuously influence the crystal shape by the pressure at all temperatures using the process according to my invention. For making heavier or thicker compact calcium sulfate alpha-hemihydrate crystals of this crystal pattern, the process pressure in the autoclave is increased and a gas is forced into the autoclave. One can work with a constant pressure in this special recrystallization transformation, although this too can be changed during the treatment.

The molded body can be made so that it is not destroyed on treatment in the autoclave. That is generally the case without special features or conditions. A binding agent can also be added to the calcium sulfate dihydrate used to make the molded bodies as required in the process of my invention. A suitable binding agent especially is finely divided calcium sulfate alpha-hemihydrate, e.g. added until its proportion amounts to about 5% by weight. To adjust the pore volume the calcium sulfate dihydrate can be replaced by a suitable foam as is known for making lightweight building materials.

My invention also provides a composition of matter comprising the calcium sulfate alpha-hemihydrate made by the above processes according to my invention. This composition of matter is characterized by one particular crystal pattern and surface fine structure as well as an exceptionally uniform chemical composition.

The plaster of paris according to my invention can be used in a variety of compositions of matter. A binding agent for the immediate and rapid setting building material used for underground construction including tunnel and gallery digging and for support in underground mountain operations including a ground calcium alpha-hemihydrate composition of matter made according to my process is one example. Other examples include a binding agent for a self-leveling floor plaster, a setting agent used in a rapid repair paste for rapid setting of a concrete and/or asphalt roof, a fiber and/or chip reinforced plate product, a porous foamlike gypsum interwall plate, a porous foamlike liqhtweight gypsum flux additive for use in a calcium silicate product, a porous foamlike adsorbent for use as an oil binder, solvent binder or animal litter and a material for making molds for ceramic purposes.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
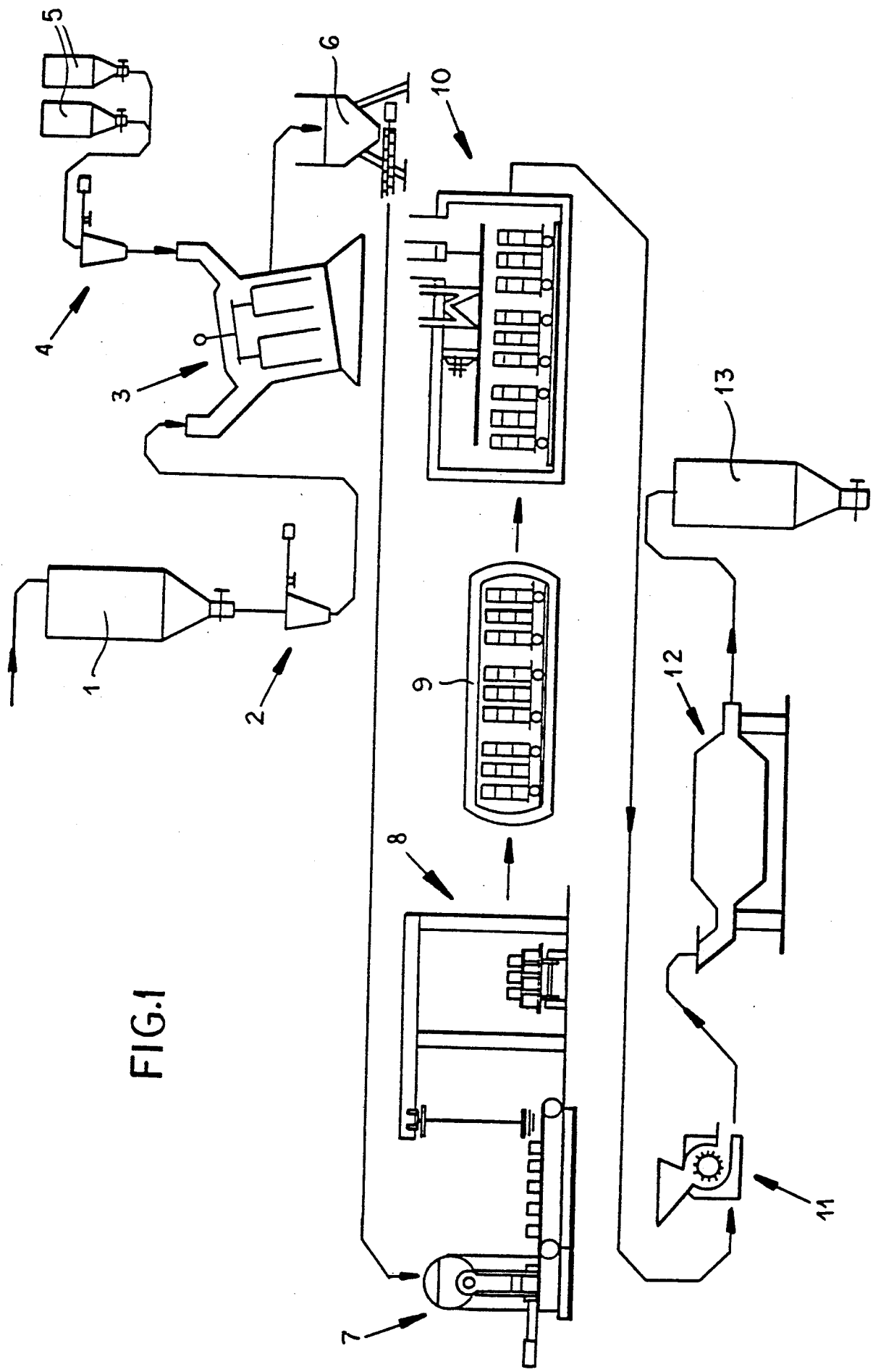
FIG. 1 is a flow diagram of a plant for performing the process according to my invention.

The plant shown in FIG. 1 comprises a supply silo 1 which receives calcium sulfate dihydrate in the form of gypsum made in the course of flue gas desulfurization.

The calcium dihydrate is fed from the supply silo 1 by a metering device 2 to a mixing device 3 which is also combined with another metering device 4 for delivery of an additive 5 if required. The calcium sulfate dihydrate from the mixing device 3 reaches an intermediate container 6 from which it is fed to a forming device 7.

The forming device 7 can comprise a pressing machine for making substantially rectangular products, an extrusion device with a downstream cutting device for the extrudate coming from the extruding device, a granulating machine, as is used in the making of pellets or also a casting mold with vibratory or shaking compression and/or chemical fixing.

The calcium sulfate dihydrate is molded or formed in the forming device into rigid, stable and autoclavable molded bodies which have a pore volume of 15 to 60% of total volume.

The total pore volume comprises an air pore volume of at least 5% by volume and, when the starting material is wet, the balance of the pores are filled with water.

The product, i.e. the molded or formed bodies, substantially shaped as briquettes, parallelipiped blocks or pellets, in suitable baskets are positioned by a stacking device 8 on a movable carriage so that as large a free accessible surface as possible remains. The molded or formed bodies or blocks so stacked are guided into an autoclave 9 and by the load are autoclaved in saturated steam at a temperature of between 110° C. and 180° C. until they are practically completely transformed into calcium sulfate alpha-hemihydrate crystals. If necessary a suitable pressure lock or gate can be provided for the carriage carrying the formed or molded bodies to and fro in the autoclave 9.

The autoclaved molded or formed bodies are dried subsequently in a drying unit 10 to balance the moisture content, e.g. to a 1% moisture content, so that then they be broken up in a crushing or breaking unit 11 and subsequently are ground to the desired grain size for the particular application in a grinding unit 12.

From the time it leaves the autoclave 9 until the time it leaves the grinding unit 12 and enters a silo 13, the calcium sulfate alpha-hemihydrate is kept above the thermal stability limit, i.e. over about 45° C., to avoid reforming calcium sulfate dihydrate.

For crushing a hammer mill can be used. The drying unit 10 can also follow the crushing unit 11 and can be also a fluid-entrainment flow drier. If necessary drying and grinding can be performed in the same step. The grinding unit 12 can be a cage mill, a ball mill or a pin disk mill with a subsequent separator, classifier or sifter.

Figure 2:
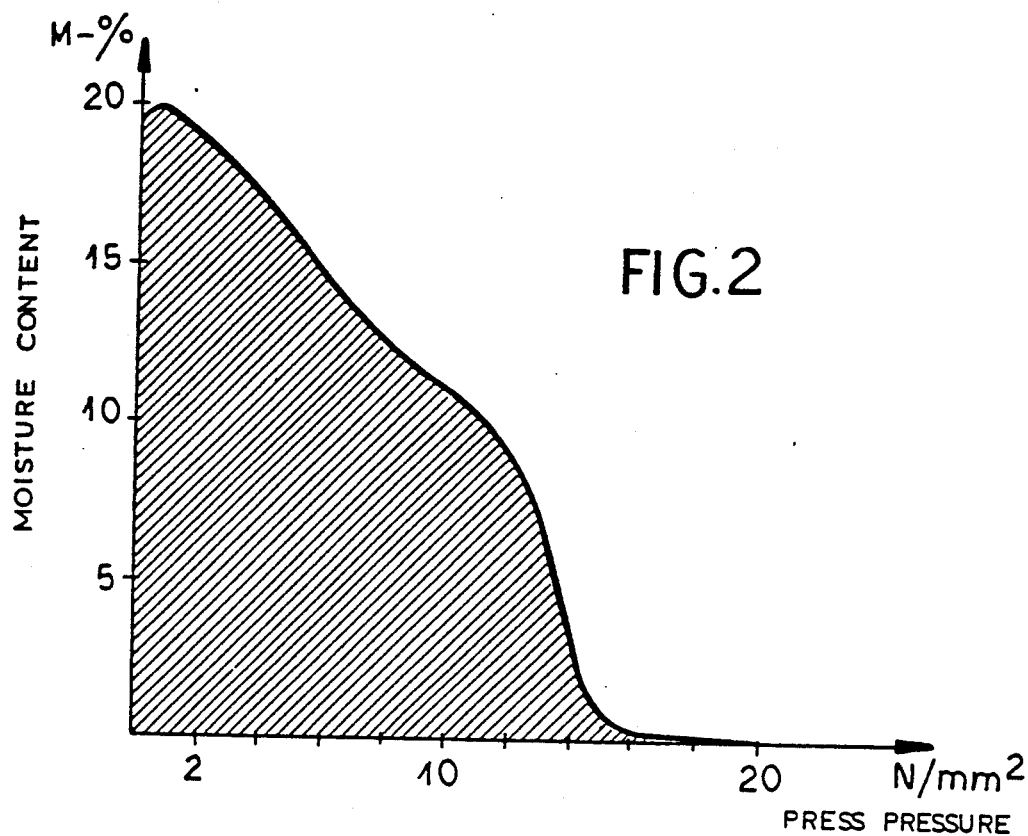
FIG. 2 is a graphical illustration of the dependence of the supplied moisture content of the calcium sulfate dihydrate on pressure in regard to making rigid, stable and autoclavable molded bodies.

FIG. 2 shows the range of moisture content of the calcium sulfate dihydrate (shaded region) tolerable in the manufacture of the molded body as a function of the applied pressure. The moisture content in % appears on the ordinate, the pressure in $N/mm^2$ on the abscissa.

These molded bodies made by pressing are rigid, stackable and are crack-free from crack formation in subsequent autoclaving. The calcium sulfate dihydrate is compressed to a molded body with a suitable degree of supplied moisture. The moisture content is between 5 and 20% by weight.

If because of a variety of reasons the moisture content exceeds about 20% by weight, a predrying can be performed to be able to work in the shaded region of FIG. 2. A pressure between 0.10 to 14 $N/mm^2$ is used. Advantageously the pressure should be between 1 to 5 $N/mm^2$, especially 2 to 3 $N/mm^2$.

If one works in the right hand portion of FIG. 2 outside the shaded region in the graph, one indeed obtains molded or formed bodies but they are not autoclavable without forming fractures or cracks and are destroyed during autoclaving. Still further in the right hand portion of the graph of FIG. 2 with constant moisture content but increasing pressure the molded or formed body sticks to the molding tool of the press. The pressure is thus adjusted so that the molded body parameters remain in the shaded region of FIG. 2. Basically a high starting moisture content increases fracture or tear tendency in autoclaving, while a lower pressure reduces the tendency to tear in the molding during autoclaving.

Instead of predrying with more than about 20% by weight starting moisture content in the calcium sulfate dihydrate and/or for improvement of the stability and stackability of the manufactured molded body, a chemical strengthening agent can be fed by the metering device 4 and especially until up to 5% by weight of the calcium sulfate alpha-hemihydrate which can be made by the process. Alternatively calcium sulfate beta-hemihydrate or another nonalkali fixing agent can be used. This is especially important during use of a casting mold as a molding device. Mixing of these kinds of substances is problem-free because of the fine grained consistency of the starting material.

Figure 3:
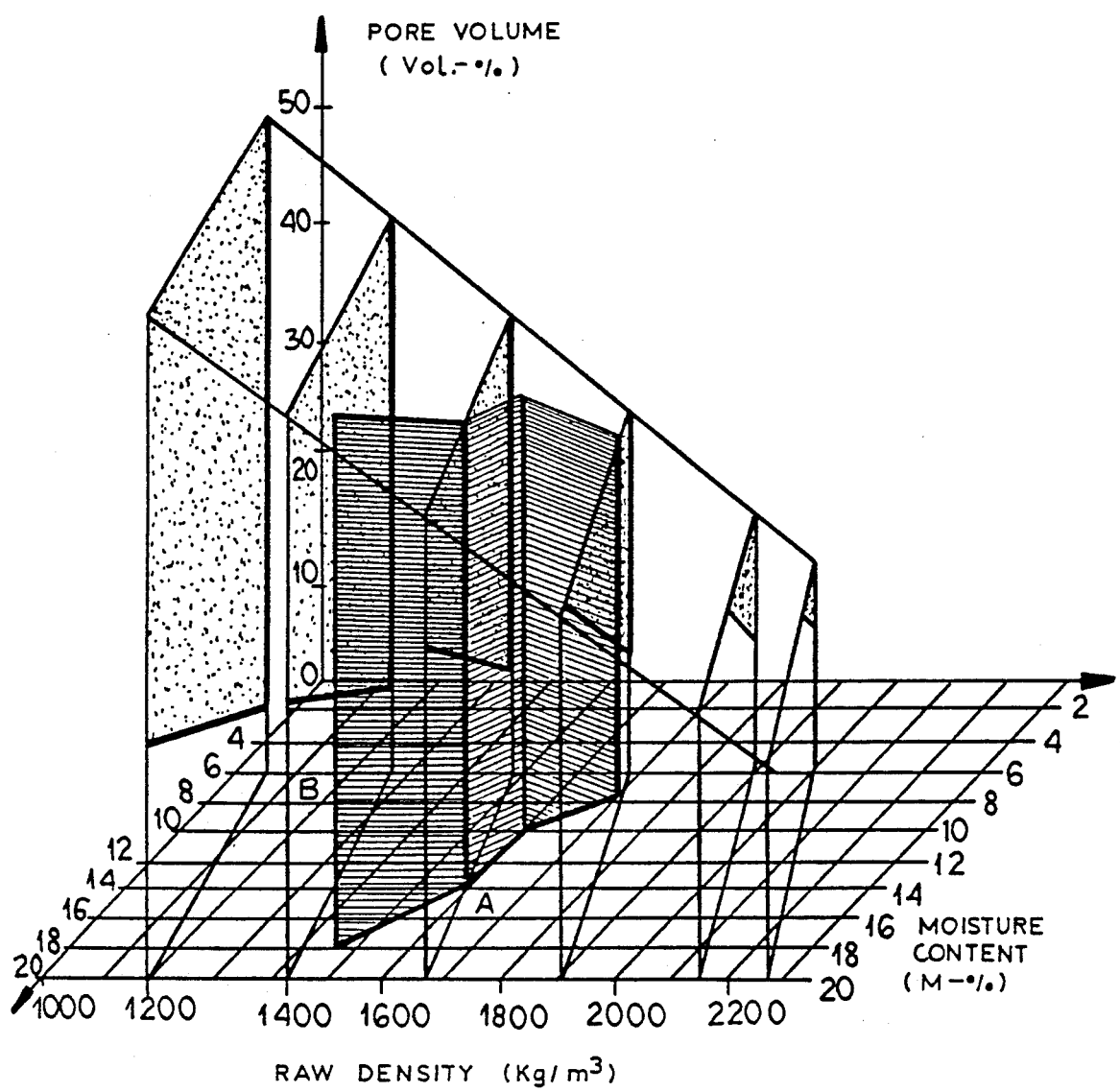
FIG. 3 is a graphical illustration of a three-dimensional representation of the dependence of the total pore volume of the calcium sulfate dihydrate molded body on the molded body crude density and the molded body moisture content combined from air-filled regions (shown with dotted areas) and water filled regions (shown with clear or undotted areas) with a dividing surface indicating the boundary for crack-free autoclaving.

If other molding processes are used beyond those molding engineering processes customarily used with limestone and lime sandstone, the mold body rough density and the mold body moisture content can be used as characteristic variables equivalent to and instead of the pressure as is indicated in FIG. 3. As required by the pure gypsum density ($=2.315$ $g/cm^2$), the molded body rough density and the moisture content in the molded body adjust themselves to pores containing a well defined amount of air and if necessary water.

In FIG. 3 the clear areas indicate the water pore volume, the dotted areas the air pore volume. The hatched shaded area is the boundary which separates those molded bodies which can be autoclaved tear or fracture free (rear region B) from those which cannot (front region A).

The molded bodies are essentially autoclavable when the air pore volume is greater than the water pore volume. The total pore volume required for the crack-free autoclaving and its composition is as is shown from FIG. 3.

Figure 4:
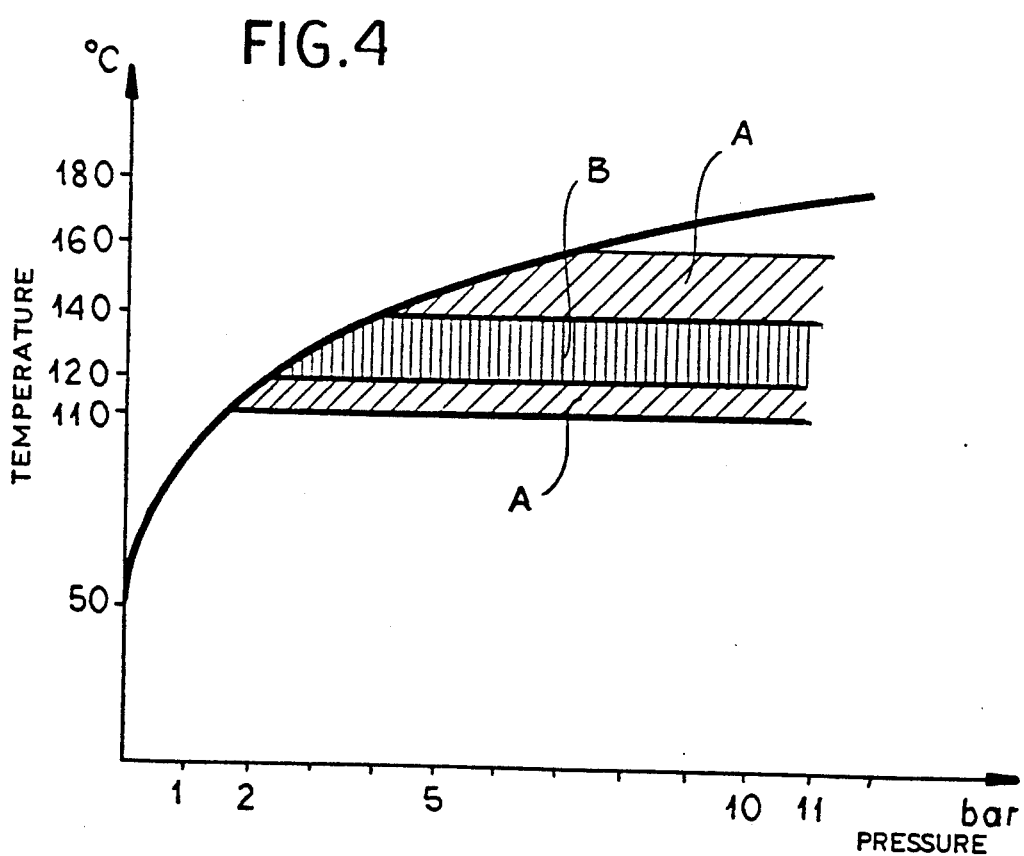
FIG. 4 is a graphical illustration of the dependence of the stability range for the alpha-hemihydrate on temperature and pressure.

FIG. 4 shows the steam pressure curve for water in a pressure/temperature diagram which indicates the functional relationship between pressure and temperature in an autoclave operating with saturated steam. Further FIG. 4 shows the stability area (A+B) and the preferred synthesis area B for the calcium sulfate alpha-hemihydrate made according to this process. This can be made in a temperature range between 110° C. and 160° C. Temporary temperatures up to 180° C. are permitted and the synthesis pressure in the autoclave indicated clearly through the pressurized gas feeder can be clearly increased relative to the saturated steam pressure present at this temperature.

To make calcium sulfate alpha-hemihydrate with a good crystal pattern, i.e. large, compact individual crystals (primary grain size), advantageously in prismatic form with average grain size (prism size) between 120° C. and 140° C. The calcium sulfate alpha-hemihydrate has a multi-faceted crystal surface with a very large primary grain size (prism length) This improves the reactivity and thus the workability, the rigidity and the solidification inside a short time with mortars and pastes which are made using a calcium sulfate alpha-hemihydrate.

Making calcium sulfate alpha-hemihydrate with a higher synthesis pressure, i.e. in the region to the right of the steam pressure curve in FIG. 4, leads to a still more compact individual crystal with a smaller specific surface area. From this advantages result in the manufacture of plasters and pastes for applications which above all are characterized by reduced water requirements, good processing and high solidity.

Working in the region B leads to a very regular crystal pattern in which the crystal surfaces are controlled by increasing the pressure over the saturated steam pressure by feeding in a gas at a suitable pressure and these surfaces are smoother. With increased temperature between 140° C. and 160° C. an increased recrystallization transformation rate, i.e. shorter autoclaving time, results in an increasing needle-forming pattern of the calcium sulfate alpha-hemihydrate crystal with increasing proportions of smaller and stronger needle shape calcium sulfate anhydrite crystals.

In working at temperatures from 120° C. gradually downward toward 110° C. the prismatic character of the crystals decreases. The crystal pattern as such is independent however it is altogether homogeneous.

The crystallization agents and/or crystal growth inhibitors as well as the corrosion inhibitors if necessary provided to the calcium sulfate dihydrate before making the molded body influence on the one hand the crystal pattern and the surface fine structure and on the other hand the technological properties of the final products made from the calcium sulfate alpha-hemihydrate. These final products are influenced by the grinding up of the calcium sulfate alpha-hemihydrate which is effected according to the provided purpose.

Figure 5:
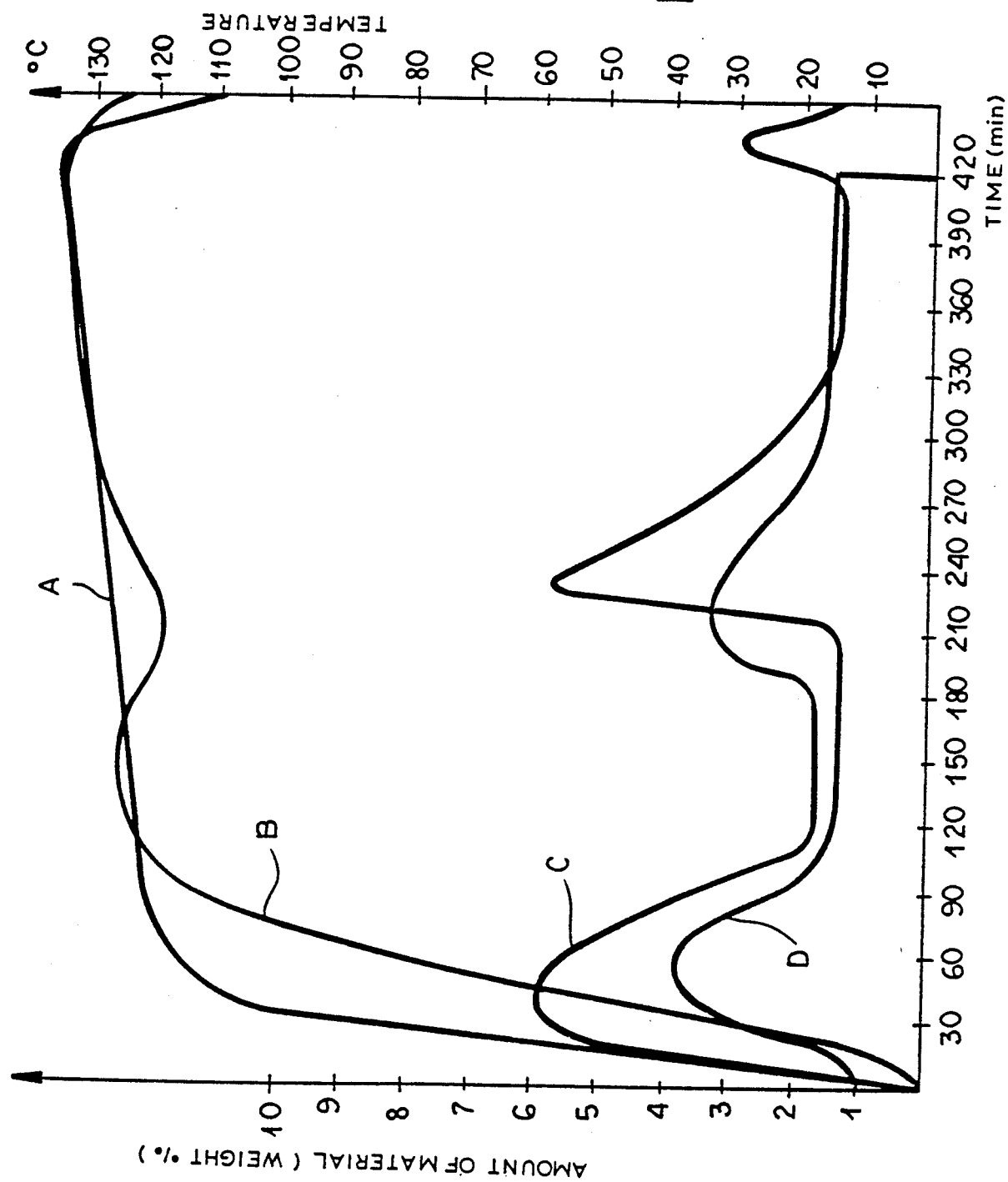
FIG. 5 is a graphical illustration showing the time course of different important quantities in the autoclaving process.

FIG. 5 shows the time course of the autoclave inner wall temperature (curve A), the temperature on the interior of a molded body of a size of 20 cm=20 cm=9.5 cm (curve B) and the time course of the steam required (curve C) and the yield in the condensate in the autoclave condensation (curve D). As seen from the course of the curves A and B the temperature in the inside of the molded body follows the autoclave interior wall temperature with only a slight time delay. The temperature decrease inside the molded body after attaining the provided autoclave temperature is required by the endothermic recrystallization transformation reaction and is subsequently balanced by the additional steam feed. The curve C indicates the time course of the steam quantity required during autoclaving.

A larger steam requirement exists for heating the filled autoclave. After that the steam requirement drops to a lower value for balancing the loss. Subsequently newly generated steam for balancing the temperature decrease as a result of the endothermic recrystallization transformation reaction is required. Thereafter the steam requirement drops again to a lower value for balancing the loss.

The curve D shows the time evolution of the condensate quantity accumulating in and withdrawn from within the autoclave.

The first maximum results from the condensate formed going to the autoclave walls and the other metal parts. The difference between the steam quantity (curve C) and the condensate quantity (curve D) in this time interval yields the water quantity received in the mold body which acts to heat the molded body and then also remains in it. After that a lower level as in curve C results according to the mass or loss balance.

Along with the recrystallization transformation to comparatively large calcium sulfate alpha-hemihydrate crystals and the reduction combined with it of the specific surface in the molded body, there is an increasing yield of extract (temporarily there is some delay in the onset of the recrystallization transformation reaction, among other things because of the time until the extract is discharged from the autoclave).

The extract quantity is proportional to the reduction of the specific surface. Large compact crystals with small specific surface lead to a comparatively larger extract yield. The extract delivery is then ended when the recrystallization transformation reaction ends.

The extract contains water soluble salt or suspended material from the starting material whereby the amount of these contaminants in the final product is lowered. According to the material removed an improvement in the quality of the final product is obtained. In this connection it is pointed out that not only the water and/or condensed steam forced in the pore spaces of the molded body eventually as a result of the fresh starting material take part in the recrystallization transformation reaction but also the crystal water of the calcium sulfate dihydrate set free in the recrystallization transformation reaction.

The third maximum of the curve results from the lowering of the pressure in the autoclave at the end of the autoclaving so that the excess pressure formed in the molded body leads to a pressure gradient between the interior and the exterior of the molded body because of the air found in it and the steam formed by the revaporization of the water. Thus the water located in the molded body is at least partially forced out. However the pressure may not be lowered so much and/or so quickly that the molded body cracks or bursts. In this way one attains an additional dewatering which reduces the later drying expense. Moreover dissolved or suspended by-products or impurities are carried away. The grinding up of the manufactured alpha-hemihydrate is effected according to the provided purpose. The grain size influences both the reinforcement and strengthening of the calcium sulfate alpha-hemihydrate treated with water.

Figure 6:
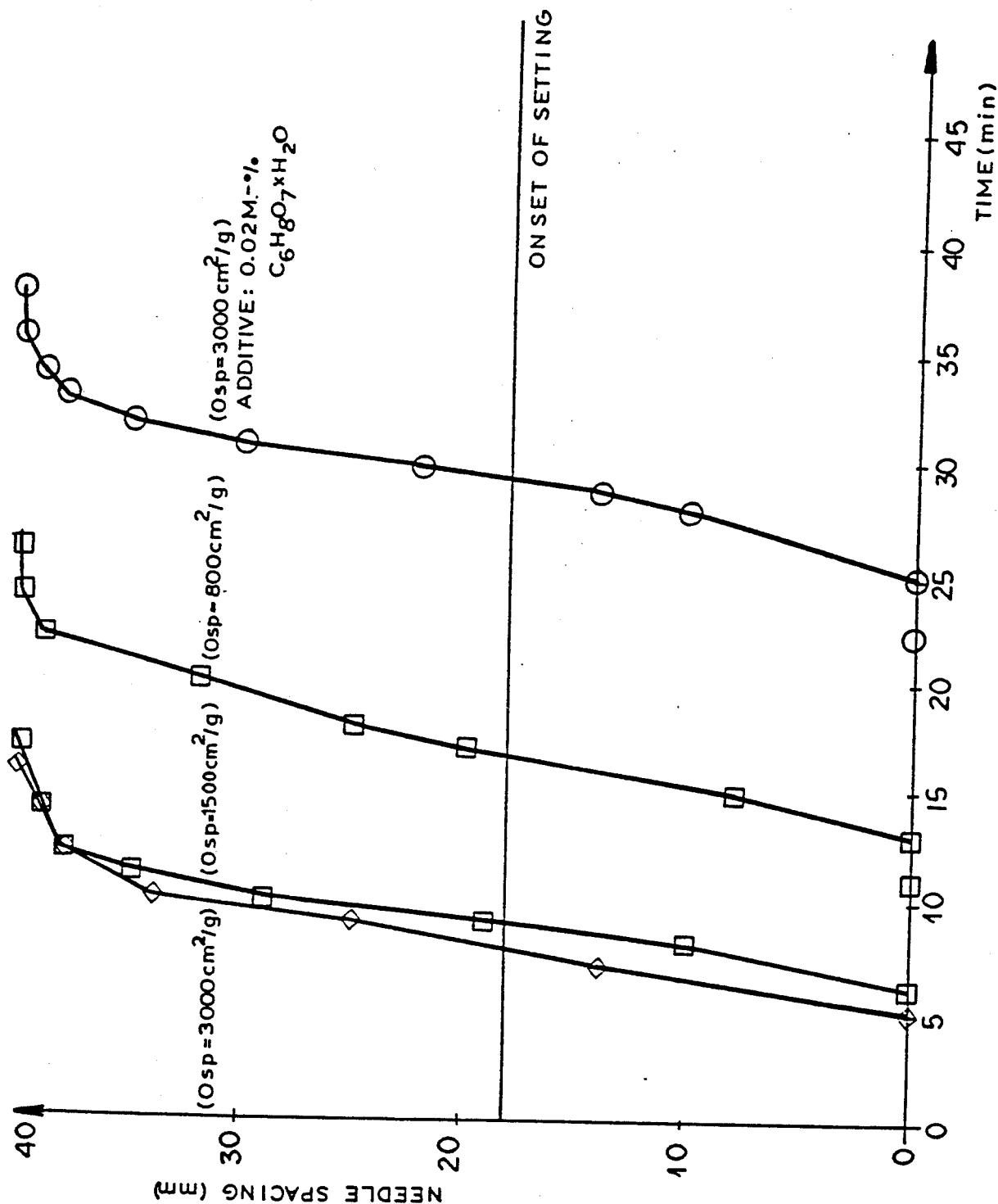
FIG. 6 is a graphical illustration showing the dependence of the compression strength of the alpha-hemihydrate suspension on the grain fineness.

In FIG. 6 the compressive strength of the calcium sulfate alpha-hemihydrate suspension as a function of time depending on the grain size is plotted. On the ordinate the needle spacings or displacements in mm in a Vicat Unit based on DIN (German Industrial Standards Publication) 1168 are plotted while on the abscissa the times in minutes are plotted. It is apparent that with increasing specific surface $O_{sp}$ the strengthening onset or the beginning of the rapid increase in compression strength is displaced to shorter times.

Thus the addition of a retardant for the strengthening or setting, substantially in the form of citric acid monohydrate, is appropriate at least with calcium sulfate alpha-hemihydrate crystals with higher specific surface. Thus the onset of setting of alpha-hemihydrate with a specific surface of 3000 $cm^2/g$ is shifted by about 7 min to about 30 min when 0.02% by weight of citric acid monohydrate is added.

Figure 7:
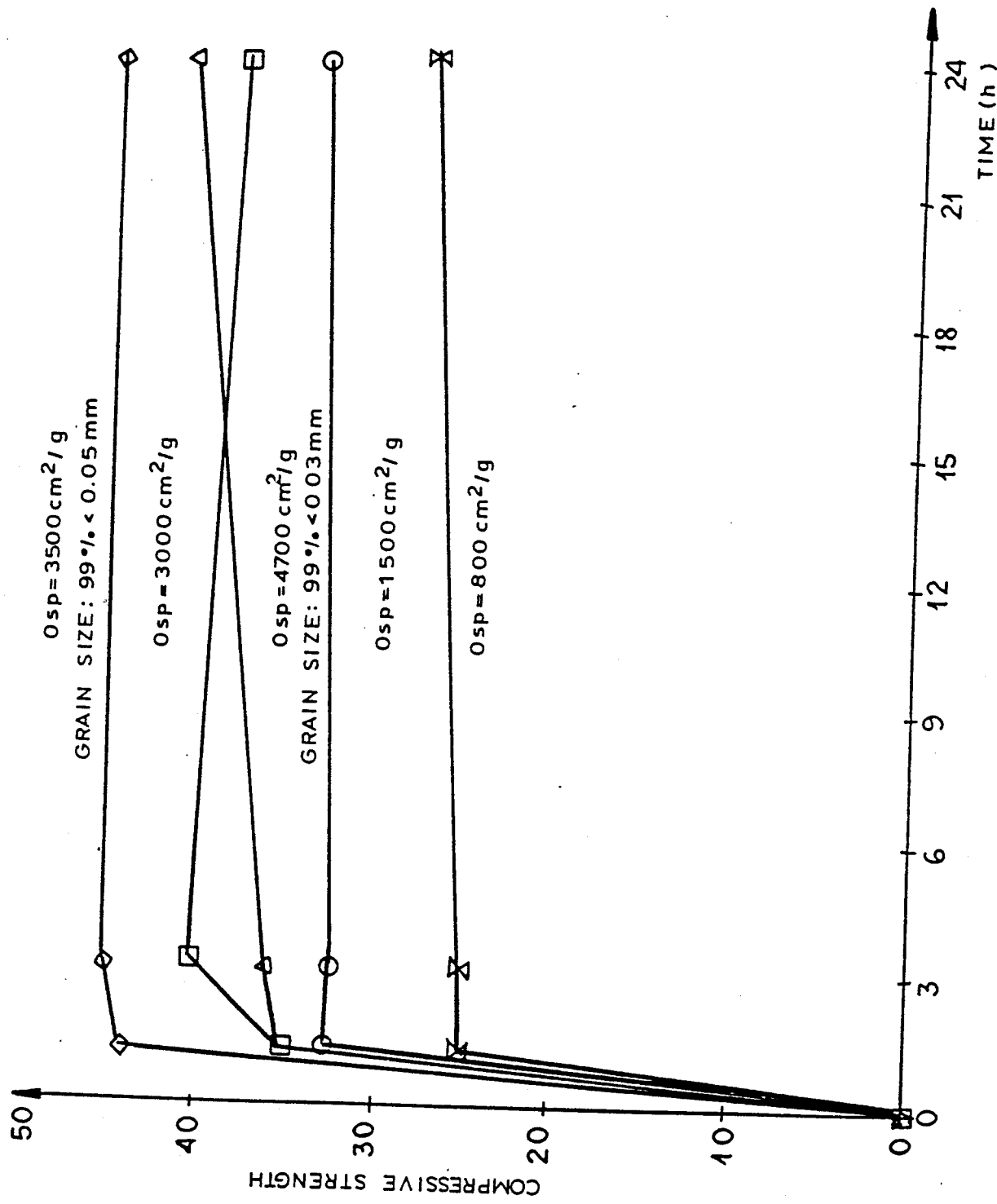
FIG. 7 is a graphical illustration showing the dependence of the compression strength of pastes which were made from the calcium sulfate alpha-hemihydrate according to my invention on the grain fineness.

As seen from FIG. 7 the grain size influences the compression strength development. In FIG. 7 the compression strength in N/mm$^2$ is plotted on the ordinate and on the abscissa the time in hours is plotted. The different curves illustrate the compression strength development for the alpha-hemihydrate pastes made from alpha-hemihydrate with the indicated specific surface with the addition of 0.02% by weight citric acid monohydrate. The alpha-hemihydrate with a specific surface of 3500 and/or 4700 cm$^2$/g is seen. The water requirement in this case amounts to about 0.28 expressed by the ratio of water/gypsum(W/G).

I claim:

1. In a process for making calcium sulfate hemihydrate from a finely divided calcium sulfate dihydrate by recrystallization transformation of said calcium sulfate dihydrate in the presence of saturated steam, the improvement wherein a molded body is formed by pressing said calcium sulfate dihydrate, at a pressure from 0.1 to 14 N/mm$^2$, said dihydrate having physically bound water in a range from about 3 to 20% by weight, said pressing being sufficient to achieve a pore volume that is 15 to 60% of total volume and more than 5% by volume of said pore volume contains air, said molded body being fed at ambient temperature to an autoclave and being heated in said autoclave with saturated steam, water being formed by condensation of said saturated steam and subsequently being drawn into said molded body as a condensate by capillary action of open systems of said pores, water held in said pores at least partially coming from said finely divided calcium sulphate dihydrate from which said molded body is formed, regulating crystal growth and crystal pattern of said calcium sulfate hemihydrate which grows from an aqueous solution phase by a process temperature in a range between 110° C. and 180° C. and by the pressure of the process atmosphere in said autoclave said pressure being at or above that of saturated steam at said process temperature, after said growth at least partially forcing out said water present in said pore volume of said molded body by controlled release of said pressure in said autoclave, and said molded body being removed from said autoclave.

2. The improvement defined in claim 1 wherein said molded body is formed with 25 to 35% by volume being said pore volume.

3. The improvement defined in claim 1 wherein said molded body is formed in which at least half of said pore volume is filled with air.

4. The improvement defined in claim 1 wherein said process is performed primarily with said process temperature above 140° C.

5. The improvement defined in claim 1 wherein said process is performed with said process temperature in a range from 120° C. to 140° C.

6. The improvement defined in claim 1 further comprising forcing an additional gas into said autoclave.

7. The improvement defined in claim 1 wherein said calcium sulfate dihydrate made by desulfurizing flue gas is mixed with a growth influencing additive prior to making said molded body, said growth influencing additive being selected from the group consisting of finely divided pieces of finely divided brown coal, finely ground peat, finely ground wood, humic acid and mixtures thereof.

8. A process for making calcium sulfate hemihydrate from a finely divided calcium sulfate dihydrate by transforming said calcium sulfate dihydrate in the presence of saturated steam comprising:

(a) forming a molded body by pressing with a pressure from 0.1 to 14 N/mm$^2$ in an autoclave said calcium sulfate dihydrate, said dihydrate having a content of physically bound water in a range from about 3 to 20% by weight, said pressing being sufficient to achieve a pore volume that is from about 15 to 60% of total volume and more than about 5% by volume of said pore volume contains air;

(b) feeding said molded body to an autoclave;

(c) heating said molded body in said autoclave under said saturated steam at a temperature of between 110° C. and 180° C. to regulate crystal growth of said calcium sulfate hemihydrate;

(d) after said growth at least partially forcing out water present in said pore volume of said molded body by controlled release of said pressure in said autoclave; and (e) removing said molded body from said autoclave.

9. A process defined in claim 8, further comprising mixing a growth influencing additive with said calcium sulfate dihydrate prior to making said molded body, said growth influencing additive selected from the group consisting of finely divided pieces of brown coal, finely ground wood, humic acid and mixtures thereof.

10. A process defined in claim 8, further comprising heating with said temperature above 140° C.

11. The improvement defined in claim 1, further comprising grinding said molded body which has been removed from said autoclave.

12. The process defined in claim 8, further comprising grinding said molded body removed from said autoclave.

* * * * *